United States Patent
Papadimitriou (10) Patent No.: US 8,515,842 B2
(45) Date of Patent: Aug. 20, 2013

(54) SYSTEMS AND METHODS FOR MONITORING AND OPTIMIZING CREDIT SCORES

(75) Inventor: Odysseas Papadimitriou, Arlington, VA (US)

(73) Assignee: Evolution Finance, Inc., Arlington, VA (US)

( * ) Notice: Subject to any disclaimer, the term of this patent is extended or adjusted under 35 U.S.C. 154(b) by 12 days.

(21) Appl. No.: 12/882,144

(22) Filed: Sep. 14, 2010

(65) Prior Publication Data

US 2012/0066106 A1  Mar. 15, 2012

(51) Int. Cl.
*G06Q 40/00* (2012.01)

(52) U.S. Cl.
USPC .......................................................... 705/35

(58) Field of Classification Search
USPC .............................. 705/35–45, 1.1
See application file for complete search history.

(56) References Cited

U.S. PATENT DOCUMENTS

| | | | |
|---|---|---|---|
| 7,593,891 B2 * | 9/2009 | Kornegay et al. | 705/38 |
| 7,610,229 B1 * | 10/2009 | Kornegay et al. | 705/38 |
| 7,653,593 B2 * | 1/2010 | Zarikian et al. | 705/38 |
| 7,711,635 B2 * | 5/2010 | Steele et al. | 705/38 |
| 7,814,004 B2 * | 10/2010 | Haggerty et al. | 705/38 |
| 7,814,005 B2 * | 10/2010 | Imrey et al. | 705/38 |
| 7,925,582 B1 * | 4/2011 | Kornegay et al. | 705/38 |
| 7,970,676 B2 * | 6/2011 | Feinstein | 705/35 |
| 8,001,041 B2 * | 8/2011 | Hoadley et al. | 705/38 |
| 8,015,107 B2 * | 9/2011 | Kornegay et al. | 705/38 |
| 8,078,524 B2 * | 12/2011 | Crawford et al. | 705/38 |
| 8,099,356 B2 * | 1/2012 | Feinstein et al. | 705/38 |
| 8,335,741 B2 * | 12/2012 | Kornegay et al. | 705/38 |
| 2003/0046223 A1 * | 3/2003 | Crawford et al. | 705/38 |
| 2004/0111359 A1 * | 6/2004 | Hudock | 705/38 |
| 2005/0154664 A1 * | 7/2005 | Guy et al. | 705/35 |
| 2006/0004654 A1 * | 1/2006 | Kornegay et al. | 705/39 |
| 2006/0178971 A1 * | 8/2006 | Owen et al. | 705/35 |
| 2006/0200396 A1 * | 9/2006 | Satterfield et al. | 705/35 |
| 2006/0242039 A1 * | 10/2006 | Haggerty et al. | 705/35 |
| 2006/0242049 A1 * | 10/2006 | Haggerty et al. | 705/35 |
| 2007/0112668 A1 * | 5/2007 | Celano et al. | 705/38 |
| 2007/0288338 A1 * | 12/2007 | Hoadley et al. | 705/35 |
| 2008/0109378 A1 * | 5/2008 | Papadimitriou | 705/36 R |
| 2009/0144160 A1 * | 6/2009 | Haggerty et al. | 705/14 |
| 2009/0271248 A1 * | 10/2009 | Sherman et al. | 705/10 |
| 2010/0082476 A1 * | 4/2010 | Bowman | 705/38 |

(Continued)

OTHER PUBLICATIONS

Steele, Georgia, "Credit Score Tune-Up; Like tweaking an automobile engine to improve its performance, experts say credit scores can be tweaked to help your borrower get an improved rate", Broker Magazine 8. 10 (Nov. 2006), pp. 74-78.*

(Continued)

*Primary Examiner* — Mohammad Z Shaikh (74) *Attorney, Agent, or Firm* — Moazzam & Associates, LLC (57) ABSTRACT

The present disclosure provides systems and methods that monitor, on a recurring basis, a consumer's behavior as reflected on both the consumer's credit report and other sources, identifies opportunities for optimizing the consumer's credit score, warns proactively of actions that can damage a consumer's credit score, and identifies the right time for consumers to take certain actions, including, but not limited to, actions like applying for a new credit card or closing an existing credit card. The present disclosure also provides systems and methods that implement or can assist in the implementation of the recommended actions on behalf of the consumer.

22 Claims, 6 Drawing Sheets

(56) References Cited

U.S. PATENT DOCUMENTS

2010/0169209 A1* 7/2010 Kornegay et al. .............. 705/38
2010/0223168 A1* 9/2010 Haggerty et al. .............. 705/30
2012/0066106 A1* 3/2012 Papadimitriou .............. 705/35

OTHER PUBLICATIONS

"CreditXpert Essential Advisor View", Copyright 2000-2004, CreditXpert Inc, pp. 1-6.*

"Credit Plus, Inc—Score Wizard", [retrieved on Jun. 13, 2007] Retrieved from the internet <http://web.archive.org/*/http://creditplus.com, copyright 2000-2002, pp. 1-13.*

"CreditXpert What-If Simulator", [retrieved on Jun. 7, 2005] Retrieved from the internet <URL:http://www.creditxpert.com/CreditXpert%20What-If%20Simulator(TM)%20sample.pdf>,2002, pp. 1-8.*

"myFico—FICO Score Simulator", [retrieved on Jun. 8, 2005] Retrived from internet <URL: http://www.myfico.com/Help/Simulator.aspx?fire=5, copyright 2001-2005, pp. 1-2.*

"CreditXpert Inc, Introduces a New Way for Lenders to Close More Loans by Helping Applicants Raise Credit Scores to Desired Levels and Qaulity for Better Offers", PR Newswire [New York], Mar. 16, 2004, pp. 1-2.*

"myFico—Sample",[retrieved on Jun. 8, 2005] Retrieved from internet <URL: http://www.myfico.com/Content/Samples/Sample_ScoreSimulator.asp., copyright 2001-2005, pp. 1-5.*

* cited by examiner

SYSTEMS AND METHODS FOR MONITORING AND OPTIMIZING CREDIT SCORES

BACKGROUND OF THE INVENTION

1. Field of the Invention

The present invention relates to a monitoring and optimization service. More particularly, the present invention relates to systems and methods for automated monitoring of consumer behaviors, data, and other factors that contribute to a credit score and controlling those factors to optimize credit scores.

2. Background of the Invention

Credit scores are not only an important aspect of modern life, but also one of the most important sources for financial wealth and loss, and its resulting impact on the quality of life. Practically every major financed purchase in modern society involves the determination of the purchaser's credit score before financing is approved. For example, the difference between a "good" credit score and an "average" credit score can be associated with literally thousands of dollars in excess interest expenses, fees, and even insurance premiums.

Despite its criticality in determining the creditworthiness of a consumer, the calculation of credit scores is a virtual black box for even sophisticated consumers due to the countless variables that are included in conventional credit score algorithms, the constant updating of these variables, and even changes to the algorithms themselves. These constraints leave consumers confused as to the answers to questions like, when is it the right time to close a credit card that is no longer needed, or should a certain behavior be changed in order to get a credit score increase?

Conventional systems lack the capability to analyze consumer behaviors on an ongoing and real-time basis and incorporate them into their recommendations for optimizing credit scores. In addition, existing systems lack the capability to update their data on a recurring basis and without user interaction, and to provide recommendations when the advantages for certain actions arise. In essence, existing systems only partially cater to consumers who are looking to simulate certain hypothetical scenarios at a certain point in time in the future given the modification of certain data which contribute to credit scores, and offer absolutely no value after the user stops actively interacting with the system.

Conventional systems also lack the ability to detect, on a real-time basis, consumer behaviors that need to be proactively communicated to them given the adverse effects that these behaviors can have on consumers' credit scores if they are not changed. For example, a consumer might have applied for a couple of credit cards in a short amount of time. Conventional systems do not have the ability to proactively identify this behavior and determine the effects of what will happen to the consumer's credit score if in the next 60 days he applies for one or more credit cards or loans, or the capability to alert the consumer that his credit score will suffer a significant decrease and therefore advise the consumer not to proceed with any such actions.

Thus, there is a need in the art for systems and methods, primarily used for monitoring and optimizing credit scores, which are easy to use, efficient, and capable of automatically and without user interaction provide feedback to the consumer as to which actions, which may be occurring in real time or could occur in the future, are beneficial or detrimental to the consumer's credit score.

SUMMARY OF THE INVENTION

The present invention provides for systems and methods that monitor, on a recurring basis, a consumer's behavior as reflected on both the consumer's credit report and other sources, identifies opportunities for optimizing the consumer's credit score, warns proactively of actions that can damage a consumer's credit score, and identifies the right time for consumers to take certain actions, including, but not limited to, actions like applying for a new credit card or closing an existing credit card. The present invention provides also for systems and methods that implement or can assist in the implementation of the recommended actions on behalf of the consumer.

Existing systems for assisting consumers in optimizing their credit scores suffer from a number of drawbacks. Existing systems only partially cater to consumers who are looking to simulate certain scenarios at a specific point or snapshot in time. In other words, they do not meet the consumer's ongoing and changing needs for receiving proactive warnings, understanding when it is the right time to take certain actions, understanding what behaviors need to be changed in order for consumers to better optimize their credit score, and assisting consumers in implementing the actions that are recommended by the present invention.

The present invention addresses these problems and others common in the marketplace by providing consumers with a unique and powerful tool that, on a recurring basis and without the need for consumer interaction, prompt or command, gets updated with the most recent data from the consumer's credit reports and other sources, analyzes consumer behaviors, issues recommendations about what consumers can, should, and should not do, and optionally implements certain recommendations on behalf of consumers.

In another example of the use of the present invention, a consumer might use an existing system to determine the impact of closing a particular credit card account on his credit report. At that time, the impact might be adverse to the consumer's credit score. However, by utilizing the system described by the present invention, the consumer will be notified when closing that same credit card account will have a neutral or even positive impact on his credit score.

Another non-limiting example that illustrates the limitations of existing systems, and how the present invention improves upon these limitations, is the scenario in which a consumer might have multiple credit cards but for whatever reason has decided to use one of them for most of his daily purchases. Even though he pays his credit card in full every month, when the credit card company reports his balance to the credit bureau each month, his report shows up as being almost "maxed-out" on that particular credit card. The present invention will identify that this behavior hurts his credit score and recommend that this consumer either uses a different credit card with a credit line that is at least 25% higher than the current one, or that the consumer charges his daily purchases on more than just a single card.

In one exemplary embodiment, the present invention is a system for monitoring and optimizing credit scores on a recurring basis and without user interaction. The system includes a plurality of components. A data warehouse component stores client information. A client data collection component collects client information and stores the information in the data warehouse component. A scenario generator component creates hypothetical scenarios based on client information. Credit score algorithm components receive client information stored in the data warehouse component and hypothetical scenarios generated from the scenario generator and calculate score results for each scenario. A results evaluator component compares a plurality of score results received by the credit score algorithm components and transmits a subset of the plurality of score results to either the client and/or an action evaluator component. The action evaluator component determines whether an action on behalf of the client should be taken based on both the client's needs and the score results received by the results evaluator component and, if such action is desired or beneficial, facilitates such actions.

In another exemplary embodiment, the present invention is a method for regularly monitoring and optimizing credit scores. Client information is collected and stored in a data warehouse. Client information stored in the warehouse is communicated to scenario generator component. Hypothetical scenarios are generated by the scenario generator component. Hypothetical scenarios are submitted to credit score algorithm components. Score results are received from results evaluator component. Score results are compared and a subset is transmitted to the client. A subset of score results may also get evaluated by action evaluator component. Certain recommendations may automatically get implemented by the action evaluator component on behalf of the client. These steps may be performed on an automated and recurring basis, without user interaction, prompt or command.

DETAILED DESCRIPTION OF THE INVENTION

The present invention provides methods and systems to monitor, on a recurring basis, a consumer's behavior, as reflected on both the consumer's credit report and other sources, identify opportunities for optimizing the consumer's credit score, warn proactively of actions that can damage a consumer's credit score, identify the right time for consumers to take certain actions, and assist consumers in implementing certain recommended actions in order to optimize the consumer's credit score.

The present invention may be deployed in any environment and may use data of any type. Clients could access the system through a web page via the Internet or through a mobile application. A financial institution could also provide the present invention as an additional service to clients; the financial institution can market the system as a way of looking out for the client's interests by helping the client avoid pitfalls and improve the client's credit standing. These environments are exemplary and non-limiting; the system could be operated in any environment.

The present invention may use any type of consumer behavior. Consumer behavior could include, for example, how a consumer allocates his payments, how many loans, lines of credit, and credit cards the consumer has opened, recent activity related to applying, opening, or closing loans and credit cards, data from any or all of the credit bureaus, and data about the terms and balances on the client's financial products.

Figure 1:
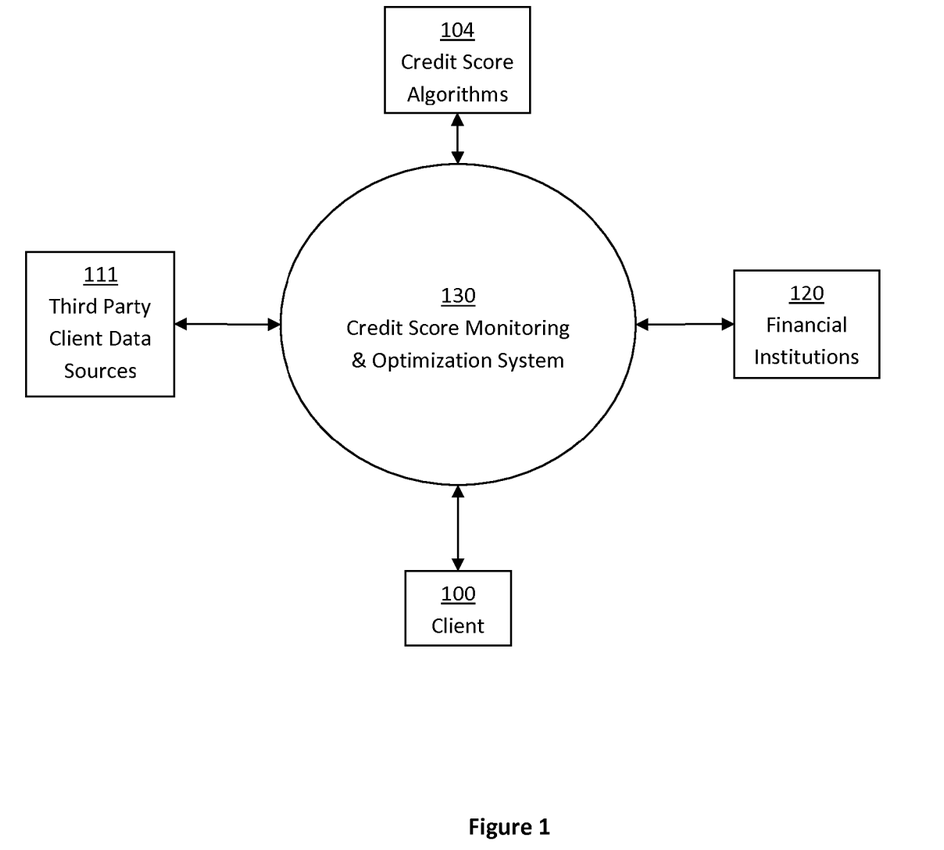
FIG. 1 shows an overview of an environment in which various exemplary embodiments of the present invention may operate.

FIG. 1 shows an exemplary environment in which the present invention may operate. Client 100, who may be an individual, corporation, or other entity, communicates with credit score system 130. As used herein and throughout this disclosure, the term "client" is also intended to be used interchangeably with the term "consumer" or "user." The term "data" is also intended to be used interchangeably with the term "information." The credit score system 130 collects data about the client 100 from both the client 100 and a number of third party data sources 111 (such as, for example, credit bureaus and public records) so that the credit score system 130 can use the collected information to create hypothetical scenarios and optimize the clients' credit scores. Once the credit score system 130 has collected sufficient information about the client 100, the credit score system 130 communicates the client information and the hypothetical scenarios to credit score algorithm components 104. The credit score system may communicate client information to any number of credit score algorithm components. The credit score algorithm components may be in a variety of locations such as, for example, within the same server as the credit score system 130, in a server which communicates directly with the credit score system 130 server, and/or a third party server.

The credit score system 130 can collect any type of client information about the client 100. The client information may be any information helpful to the credit score algorithm components 104 in evaluating the client 100 and may also be any information helpful to the credit score system 130 in creating hypothetical scenarios. For example, client information can include personal information such as the client 100's name, address, and social security number. The credit score system 130 may also collect information about any existing products the client 100 is using, such as existing loans, credit cards, checking/savings accounts, or investment accounts. The client 100 may also supply information about the client's own needs or goals, such as "increase my credit score" or "identify the right time to close my Citibank credit card (e.g., which has a burdensome $75 annual fee) so that my credit score will not decrease by more than 10 points". Clients may supply the credit score system 130 with custom scenarios, such as "close my Capital One credit card", or "open a new credit card with a $2,000 credit limit". The credit score system 130 may derive client needs from client information already collected and may also identify and track patterns of consumer behaviors that can affect the clients' credit scores.

The credit score algorithm components 104 use the client information and the hypothetical scenarios provided by the credit score system 130 to determine the impact on the client's credit score for each of the different automated or manually generated hypothetical scenarios or, in other words, to determine the credit score results. Once the credit score algorithm components 104 determine the credit score results, the credit score algorithm components 104 transmit the credit score results to the credit score system 130. The credit score system 130 evaluates and compares the credit score results it has received from the credit score algorithm components 104. This evaluation is a comprehensive comparison taking into account a variety of factors. Among many non-limiting and user-definable factors, the comparison considers how each scenario meets the client's needs, what the impact is (in terms of number of points) on the client's credit score, and how easy executing each scenario will be, given its complexity and the client's financial situation. If the credit score system 130 determines that one or more of the credit score results meet the client's needs and/or provide the client 100 with an opportunity to better optimize the consumer's credit score, either by improving it or by preventing damage to it, credit score system 130 recommends specific actions to the client 100, depending on how the client wishes to be contacted. The client 100 may then evaluate the information himself. The credit score system is also available to assist the client 100 in executing the recommended action by communicating to financial institutions component 120 on behalf of the client, should the client 100 request it. Optionally, the client 100 may pre-authorize the credit score system 130 to automatically perform all or a limited number of allowable functions to improve the credit score of the client 100 without first contacting the client 100. Such scenario would be helpful if, for example, the client 100 is embarking on a long trip where there would be minimal or no communications available for the system 130 to contact client 100 for a longer period of time. Other scenarios are also possible, such as if the client 100 believes that any recommendation made by the system 130 would be ideal and does not want to be contacted by the system 130 at all before such recommended steps are taken.

Virtually every aspect of the process described above occurs on a recurring basis and in substantially real time, with minimal to no user intervention required. The credit score system 130 updates client information on a recurring basis. The credit score system 130 transmits information to, and receives credit score results from, the credit score algorithm components 104 on a recurring basis. As the credit score system 130 receives credit score results, it performs the comprehensive comparison and, depending on the client's preferences, transmits recommended actions to the client 100. In this way, the client 100 will always have access to the most up-to-date recommendations on how he/she can optimize his/her credit scores. The system 130 can operate in real time, collecting client information, identifying consumer behaviors, creating automated and/or manual hypothetical scenarios, consulting with credit score algorithm components 104, and comparing credit score results while the client 100 is still interacting with the system. The system 130 can also operate continually over an unrestricted period of time after the user has stopped interacting with the system (e.g., hours, days, months, years after the first user interaction has stopped occurring), with the system 130 periodically collecting information about the client 100, then later consulting credit score algorithm components 104 and comparing credit score results.

Figure 2:
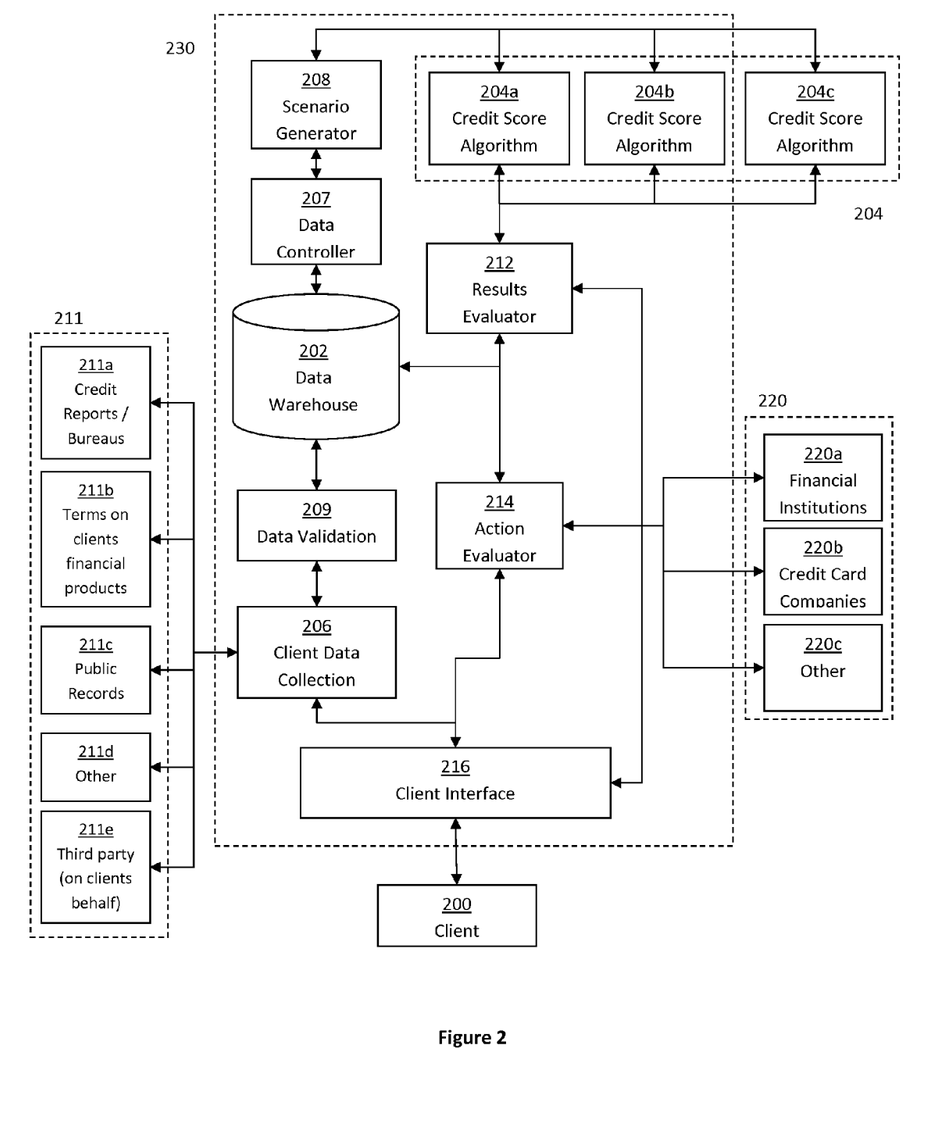
FIG. 2 shows an overview of a system according to an exemplary embodiment of the present invention.

FIG. 2 shows a more detailed exemplary embodiment of the present invention. Credit score system 230, generally outlined in dashed lines, contains a number of components, each of which is optional and may operate with one or more other components also shown in the figure. Further, for sake of simplicity of the example, most of the components shown in FIG. 2 have been shown internal to the system 230. However, it should be noted that some, most or all of the components shown may also be provided separately by completely different systems interacting together to produce the result shown and described. The scope of the present disclosure covers all such scenarios beyond the specific example shown and described herein.

The credit score system 230 interacts with client 200 via client interface 216. The client interface 216 receives information from and transmits information to the client 200. The client interface 216 could be, for example, a website, a mobile application, voice recognition software or other device which allows communication or commands between the user 200 and the system 230. The client 200 may have an account on the website and can log in to the account to enter (or update) client information into the credit score system 230, receive information about credit score results evaluated by the credit score system 230, request custom scenarios to be evaluated, and transact any other business with the credit score system 230. In addition to a website or mobile application, the client interface 216 could also have an electronic messaging capability wherein the client interface 216 can send electronic mail, text or other electronic communication to the client 200 alerting the client to new financial products.

Figure 6:
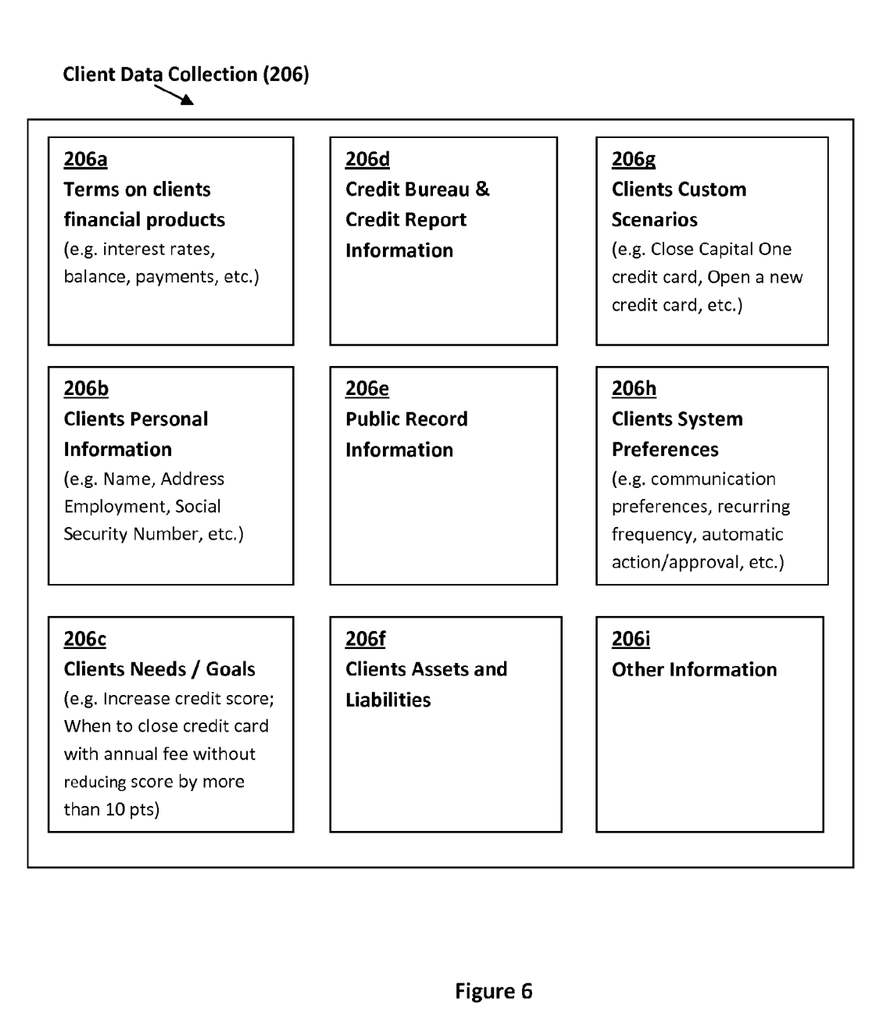
FIG. 6 shows examples of client data collection which may be collected according to various exemplary embodiments of the present invention.

Client data collection component 206 collects client information, which may include existing product terms on clients' financial products 206a (see FIG. 6. The client data collection component 206 collects client information in a number of ways. An important source of information about the client 200 is the client 200 himself. The client 200 may log into the credit score system 230 via the client interface 216 and provide information to the client data collection 230. The client data collection component 206 may also collect client information from other sources such as financial institutions, credit bureaus, public records, and other third parties, as described in more detail below.

The client data collection component 206, as shown in FIG. 2 and FIG. 6, may collect data from sources 211 other than the client in a variety of different manners. For example, the client data collection component 206 could log into (with the client 200's concurrent approval or pre-approval) the client 200's existing account with a financial institution or other organization and download client information, or the client 200 could give a financial institution permission to transmit client information directly to the client data collection component 206, as shown by box 211b. Public records 211c may be accessed directly by the client data collection component 206. A third party may also enter the client information on the client 200's behalf, shown by box 211e. For example, a financial advisor could enter information about the client 200. The client data collection component may collect information from a data provider, such as a credit report or credit bureau, shown by box 211a. The client data collection component 206 may use these or any other source (box 211d) or technique for collecting client information.

The client data collection component 206 may collect a number of different types of information about the client 200 from the various data sources 211. FIG. 6 shows some classes of client information. Client information may collect information 206a about the client's existing financial products (if any), such as interest rate, balance, fee structure, credit limit, or monthly payment. The client data collection component 206 also collects personal information 206b, such as the client's name, address, social security number, and telephone number. The client data collection component 206 may also collect information 206c about the client's needs and/or goals. These goals would depend on the client's particular financial situation. For example, if the client 200 has a Citibank credit card with a $75 annual fee that he does not want, his need might be to identify the right time to close this Citibank credit card so that his credit score is not reduced by more than 10 points. If the client 200 is in the market for a new home, the client may be looking for ways to get a 20 point improvement on his credit score so that he can qualify for a better rate on the home loan. The client data collection component 206 may also collect information 206d from the client's credit bureau and credit report, given the importance of this data on most of today's credit scores. The client data collection component may also collect public record information 206e. Information about the client's assets and liabilities 206f is also a very useful element of the client data collection component 206. For example, knowing that a client has $20,000 in a savings account and $10,000 in credit card debt, can be very valuable information in generating a hypothetical scenario of what would happen if the client used a portion of his savings to pay down his credit card debt. The outcome of such a scenario might be a significant credit score increase, which will enable the client to refinance his mortgage at a much lower rate and save thousands of dollars. The client data collection component 206 may also collect information 206g from the client directly in regards to custom scenarios that the client is interested in.

The client 200 can define any number of custom scenarios. For example, a particular client might be interested in opening a new credit card without taking a hit on his credit score. In that case, the client 200 can submit this custom scenario to the client data collection component 206 so that on a recurring basis the client 200 gets notified about the credit score impact of opening a new credit card and therefore proceed whenever it is the optimal time based on the credit score results of this custom scenario. The client data collection component 206 also collects the client's system preferences 206h. System preferences may include, among others, the client's preferred schedule or criteria for transmitting the client information to credit score algorithm components; the preferred schedule for communicating credit score results back to the client 200; and criteria for automatically approving a recommended action. Client information may include other information 206i which may be useful to the credit score system 230. Information 206a, 206b, 206c, 206d, 206e, 206f, 206g, 206h are examples of the information collected by the client data collection component 206. The client data collection component 206 collects all the information the credit score system 230 would need to obtain credit score results for the client 200 and identify the best actions for optimizing the client's credit score.

Returning to FIG. 2, the client data collection component 206 continues to collect and update client information about the client 200 over the course of the client 200's association with the credit score system 230, using the techniques and sources described above. Collecting up-to-date client information on a recurring basis gives the credit score system 230 an accurate and current (real time) picture of the client 200's situation. In turn, the credit score system 230 can generate automated, optimal hypothetical scenarios and in turn retrieve credit score results based on the client's current information, not on outdated information. For example, the client data collection component 206 may obtain a credit report for the client 200 on a recurring basis. All of these credit reports would be obtained as part of credit monitoring. "Monitoring inquiries" or "soft inquiries" do not negatively impact the client's credit score. However, standard "credit inquiries" or "hard inquiries" may negatively impact a client's credit report. The credit score system thus has frequent access to the client's most recent credit report while still preserving the client's credit worthiness.

The client data collection component 206 may transmit client information it has collected to a data validation component 209 prior to storing client information in data warehouse 202. The data validation component 209 validates client information to make sure that the client information is accurate and no information is missing. For example, if the validation component 209 discovers that the client's name is missing, or that the name on the credit reports does not match the name that the client has provided, or the address is incomplete, or certain required financial data is still needed, the validation component may communicate with the client data collection component 206, requesting corrected or completed information. The client data collection component 206 may then communicate with the client 200 through the client interface component 216 to get the client's help in resolving the data issues that the data validation component has identified.

Through the assistance of the validation component 209, client 200 can always be assured that the system 230 has all the information it needs to proceed or operate when the client 200 is not interacting with the system 230 because the system 230 would contact the client 230 if some pertinent data is not complete or incorrect, thereby preventing proper operation. Thus, the situation where a client 200 believes the system 230 to be working while the system 230 is actually hung up (because of bad data) would be largely avoided. Validation component 209 is optional; the client data collection component 206 may store client information in the data warehouse 202 without going through the data validation component 209.

The client data collection component 206 stores client information in the data warehouse 202. The data warehouse 202 contains information about all clients using the credit score system 230. The client data collection component 206 updates client information stored in the data warehouse 202 as needed. The client 200 may also log into the credit score system 230 at a later date and provide updated information to the client data collection component 206. The data warehouse component 202 may store any information useful to the credit score system 230. The data warehouse component 202 could, for example, store information about credit score results received from credit score algorithm components 204.

Scenario generator component 208 generates hypothetical scenarios based on the latest client data stored in the data warehouse 202 and transmits the hypothetical scenarios and the latest client information, including the client's custom scenarios, to the credit score algorithm components 204. The scenario generator 208 may use a standard set of rules/options based on the client's preferences to come up with hypothetical scenarios or may identify all of the feasible options based on the client's financial situation. For example, if a client 200 has a credit card that has a zero balance and has been inactive for 6+ months, then the standard hypothetical scenarios that will be generated may involve: (a1) closing that credit card, and (b1) keeping it open and requesting a credit limit increase. If that same client 200 also has less than three credit cards open, then the standard hypothetical scenarios may involve: (a2) opening one additional credit card, and (b2) opening two additional credit cards. Once the standard hypothetical scenarios are generated, then the permutations of all the standard hypothetical scenarios create an additional set of hypothetical scenarios. So based on this example, the permutations would create an additional four hypothetical scenarios: (a1)+(a2), (a1)+(b2), (b1)+(a2), (b1)+(b2).

The scenario generator component 208 may also observe patterns in client behavior as that is reflected by the client data that is stored in the data warehouse component 202, in order to create hypothetical scenarios. For example, a client 200 might have multiple credit cards but for whatever reason has decided to only use one of them for most of his daily purchases. Even though the client 200 pays the credit card in full every month, as indicated by the information provided directly by the client 200, when the credit card company reports, on a monthly basis, the client's balance to the credit bureau, it shows up on the client's credit report as being almost "maxed-out" on that particular credit card. The scenario generator 208 will identify this behavior and generate at least two hypothetical scenarios: (a3) the client uses a different credit card with a credit line that is 25%+ higher than the current one, and (b3) the client spreads out his daily purchases on more than just a single credit card. These or any other rules or algorithms or logic may be used by the scenario generator 208 to construct hypothetical scenarios that, together with the client's custom scenarios and the client's data, will be submitted to the credit score algorithm components 204 when instructed by data controller 207.

Data controller component 207 determines the frequency of operation for the scenario generator component 208 and may use the client's own preferences to determine the frequency. A predetermined schedule or certain criteria could be set by the client 200 as part of system preferences 206h (shown in FIG. 6) or by the data controller 207. These or any other criteria or schedule may be used by the data controller 207 to determine when to instruct the scenario generator 208 to operate. The client 200 may, for example, specify that the credit score system 230 should transmit potential credit score results based on hypothetically generated scenarios on a monthly schedule without any further client prompt, command or interaction. The data controller 207 will then instruct the scenario generator component 208 to operate once every month. The data controller 207 may also instruct the scenario generator component 208 to operate when certain criteria are met, such as when credit score algorithms change, the client's financial situation changes, the client's creditworthiness changes, or any data stored in the data warehouse component 202 changes. For example, the data controller 207, using information stored in the data warehouse 202, may determine that a number of new "hard inquiries" (usually a result of loan applications) have shown up in a client's credit report. In response, the data controller 207 instructs the scenario generator component 208 to operate. Using the new information, the scenario generator component 208 generates many hypothetical new scenarios. One of the hypothetical new scenarios is the scenario in which the customer has an additional new "hard inquiry" in the next 30 days. Based on the credit score results of such a hypothetical scenario, the client 200 might be proactively warned not to submit another loan application, because it will create another "hard inquiry" and his credit score will be damaged. In another example, the data controller 207 determines, on a real-time basis, that the client 200 submitted a new custom scenario and instructs the scenario generator component 208 to operate. The scenario generator component 208 transmits the updated client data 206 and the custom scenario to the credit score algorithm components 204 so that the client 200 can receive the credit score results for the custom scenario.

Credit score algorithm components 204a, 204b, 204c (collectively referred to as credit score algorithm components 204) determine, based on client data, what the credit score is for each of the hypothetical and custom scenarios (collectively referred as the credit score results) received by the scenario generator component 208. Each credit score algorithm component 204a, 204b, 204c represents a different type of credit score in the marketplace. There are many different types of credit scores in the marketplace, including the FICO Score, the Vantage Score, and the TransRisk Score. The credit score algorithm components 204 may be stored in any location and may use a variety of criteria and proprietary statistical models for evaluating the creditworthiness for the client 200. For example, the credit score algorithm component 204c is located at a credit bureau. The credit bureau may want to keep its evaluation criteria and models confidential and for this reason (or any other reason) the credit score algorithm component 204c is located at the credit bureau. The credit score algorithm component 204b is located in-house, under the control of the same entity operating the credit score system 230. The entity that has developed the credit score associated with the credit score algorithm component 204b also uses confidential criteria and statistical models to evaluate clients, but as a result of a partnership or other arrangement, the particular entity is willing to allow the credit score algorithm component 204b to remain in-house. The credit score algorithm component 204a is also located in-house and uses criteria and statistical models that are proprietary but under the ownership of the same entity operating the credit score system 230. There may be any number of the credit score algorithm components 204. The credit score algorithm components may be located anywhere and may use any criteria or statistical models or mathematical algorithms in evaluating the credit score results for the different scenarios submitted by the scenario generator component 208.

The credit score results generated by the credit score algorithm components 204 are transmitted to results evaluator component 212. The credit score results may be comprised of specific scores or score ranges for each type of credit score that is evaluated. For example, a client with a Type1 Credit Score of 740 might get for "hypothetical scenario 1" a Type1 Credit Score result of 750 and for "hypothetical scenario 2" a Type1 Credit Score result of 745-760.

Clients 200 benefit significantly from the constant optimization of their credit scores. Changing factors in the clients' data combined with changing factors in the financial industry result in a client's eligibility for different financial offers at different points in time. Having an optimized credit score enables clients to capitalize on the best opportunities available to them at any point in time. These changing factors include a changing market environment (such as rising or falling interest rates), the client's creditworthiness as it is reflected by the client's credit score, the client's financial situation (such as a salary increase or the purchase of a home), new financial products, and changes to the underwriting guidelines of existing financial products. The constant evaluation by the data controller component 207 on whether to instruct the scenario generator component 208 to operate enables the client 200 to receive, at all times, credit score results and recommendations reflecting the current environment, as opposed to recommendations reflecting a previous environment. The client 200 receives customized automated recommendations generated by the system 230 without being required to request them himself. The client 200 is assured of always having the best recommendations on how to best optimize his credit score, without hassle. Stated differently, through the use of system 230, client 200 is always assured that the system 230 is always, continuously and automatically working to make sure that the credit score of the client 200 is optimized. This peace of mind is one of the many advantages of the present system 230.

Results evaluator component 212 receives credit score results for each of the hypothetical scenarios from the credit score algorithm components 204 and comprehensively compares credit score results to determine if any of them meet the client's goals/needs and, if so, which one is the easiest for the client to act upon. The results evaluator component 212 may not perform any evaluation on client's custom scenarios 206g, since those scenarios are specifically requested by the client 200. The credit score results for the clients' custom scenarios are either directly communicated from the results evaluator 212 to the client 200 via the client interface component 216 or to the action evaluator component 214 based on the clients' system preferences 206h.

The results evaluator component 212 may start the evaluation by eliminating all the credit score results that do not meet the client's needs. For example, if the client's need is to both improve and prevent damage on his credit score, all the credit score results that have a negative impact on the client's credit score will be eliminated from further consideration, with the exception of the credit score results that relate to hypothetical scenarios involving future client actions that are deemed likely based on the client's past behavior. Building on this example, if one of the hypothetical scenarios that has a negative impact on the client's credit score involves having the client 200 close one of his credit cards, then that scenario will be eliminated from further consideration, since for the purpose of this example there is no evidence that the client 200 is likely to proceed with such an action. On the other hand, if the client 200 has been progressively building up higher credit card balances and one of the hypothetical scenarios with a negative credit score impact involves having the client 200 increase his credit card balances by another 10%, then that scenario will not be eliminated from further consideration, given the recent evidence that suggests that the client 200 is likely to continue to build up higher credit card balances. In other words, options or scenarios for action which correspond with a client's past pattern of behavior will generally not be eliminated. Once the results evaluator component 212 has narrowed down all the credit score results/scenarios that are relevant to the client's needs, the next step would be to rank order them based on the credit score improvement that they can generate and the damage that they can prevent. The next step would be to present the ones with the highest point impact (in both the positive or negative direction) either directly to the client 200 through the client interface component 216 or to the action evaluator component 214, based on the clients system preferences 206*h*.

The results evaluator component 212 may also evaluate the credit score results/hypothetical scenarios that it receives from the credit score algorithm components 204 by not only eliminating all the credit score results that do not meet the client's needs, or do not comport with a client's past behavior, but also eliminating the results that require more than a certain number of actions in order to be implemented. The number of actions can be any number that the results evaluator component deems appropriate or can even be provided by the client's system preferences 206*h*. For example, if the limit on the number of actions was set to 2 and one of the hypothetical scenarios met the client's needs of increasing his credit score by more than 20 points, but it required the client to take 3 actions then that scenario will be eliminated from further consideration. On the other hand, a hypothetical scenario that requires the client to take only 1 action, such as to pay down the balance of a particular credit card by $500, and will also result on a credit score increase of 20 points or more, will not be eliminated.

Alternatively, the results evaluator component 212 may not eliminate the credit score results that require more than a certain number of actions in order to be implemented, but may prioritize higher the credit score results that are simplest both in terms of the type of action and the number of actions. For example, between two scenarios that both require one action from the client, the scenario that requires the client to open a new credit card is simpler than the scenario that requires the client to divide spending moving forward from one credit card that is currently used to two credit cards. As a result, the first scenario on the aforementioned example will be prioritized higher.

The results evaluator component 212 may use any of the previous techniques to compare credit score results. The results evaluator component 212 may also use any other comparison techniques, alone or in combination, to compare credit score results. The results evaluator component 212 may take into account multiple factors and use complex mathematical models or decision trees when comparing credit score results. For example, in addition to comparing credit score results based on simplicity of actions, the number of actions required to implement each recommendation, and the credit score impact in terms of number of points, the results evaluator component 212 can also include things like the client's likelihood of acting on the recommended scenario and expected savings.

After the results evaluator component 212 compares credit score results, if the component determines that one (or more) of the credit score results meets the client's needs, it will transmit recommended results either directly to the client 200 via the client interface component 216 or to the action evaluator component 214, based on the clients' system preferences 206*h*.

The action evaluator component 214, subject to the clients' system preferences 206*h*, receives recommended credit score results from results evaluator component 212 in order to evaluate their feasibility and determine whether an action should and can be taken on behalf of the client 200. The action evaluator 214 uses the clients' system preferences 206*h* to determine whether an action on behalf of the client should be taken and, if so, then evaluates whether it has the appropriate capabilities and permissions/authorizations to initiate and complete the recommended action on behalf of the client 200 and, if so, whether it first requires a manual approval by the client 200 before it proceeds in implementing the recommended action on behalf of the client 200. If the action evaluator 214 determines that an automatic action should and can be taken or if it receives a manual approval by the client 200, then the action evaluator 214 will also proceed with communicating with outside/external entities 220 in order to implement the recommended actions on behalf of the client. Outside entities 220 may be, for example, financial institutions 220*a* (such as banks and credit unions), or credit card companies (220*b*). The action evaluator component 214 may use these or any other outside entities 220*c* in order to fully implement the recommended action. For example, a client 200 might have indicated on the system preferences 206*h* that if a recommended action is going to improve the credit score by more than 10 points and it will not require the transfer of funds, then the credit score system 230 should proceed automatically in implementing the recommended action on behalf of the client 200. As a result, and for the purpose of this example, if the recommended action is a request for a credit limit increase on two of the client's credit cards, then the credit score system 230 can contact the credit card companies 220*b* directly on behalf of the client and request these credit limit increases, assuming that the client 200 has also provided the credit score system 230 with all the appropriate authorizations that the system will need in order to initiate these increase requests. The action evaluator component 214 may use these or any other technique or logic, alone or in combination, to evaluate whether an action should and can be taken and, if yes, proceed with actually taking the necessary action by communicating with the outside entities 220.

System preferences 206*h* may include communication preferences and approval preferences. Communication preferences specify how the client 200 wishes to be contacted, the frequency of communication, and the priority of communication. The client 200 may specify how he wants to receive credit score recommendations, such as via e-mail, SMS text message, mobile phone application messaging, telephone, or via the mail. The client 200 can specify the frequency of communication. For example, the client 200 could create a monthly schedule of communication. Depending on system preferences, the results evaluator component 212 or the action evaluator component 214 would then communicate credit score results to the client 200 once a month. Frequency may also be determined by specified criteria, such as a minimum level of points change over the client's current credit score.

For example, the client 200 could specify that he only wishes to receive information about credit score results that would impact his credit score by 15 points or more. If the results evaluator component 212 finds a recommended action that has a credit score impact of 15 points or more and the client 200 does not want the action evaluator component 214 to evaluate any recommendations for action implementation on client's 200 behalf, then based on this example, the results evaluator component 212 will transmit the recommendation to the client 200. The client could also specify a particular priority. The client could specify that high-priority information (e.g., actions which impact credit scores by more than 15 points) should be transmitted via both e-mail and SMS, but low-priority information (such as credit score results that will impact the credit score by less than 15 points) should only be sent via e-mail.

System preferences 206$h$ may also include approval preferences. Approval preferences specify whether the action evaluator component 214 should even be activated and, if it is, when the credit score system 230 should wait for the client's approval before taking the recommended actions. In certain situations, the client 200 may want the action evaluator 214 to implement the recommended action without waiting for the client 200 to provide approval. For example, the client 200 may, in the approval preferences, instruct the credit score system 230 to automatically implement recommendations that can improve the client's credit score by more than 20 points and will not require the client to transfer more than $1,000 from his savings accounts towards any of his loans or lines of credit. If the credit score system 230 finds a recommendation meeting the criteria, the credit score system will automatically implement the necessary actions. The client 200 will be informed of the transfer pursuant to the communication preferences. System preferences include these preferences as well as any other preferences regarding the system's operation with respect to the client.

In addition to transmitting information about credit score results, the results evaluator component 212 may also transmit other information or provide the client 200 with access to other information about credit score results. This information may include expert opinion or statistics about what other clients have chosen to do in the same or similar hypothetical situations, with such information being stored in data warehouse component 202 or accessible by credit score system 230 via connection through available external databases. Providing this information may assist the client 200 in coming to a decision about which recommendation to implement, if any.

Both the results evaluator component 212 and the action evaluator component 214 may record information back into the data warehouse 202 so that the data warehouse 202 will always have the most up-to-date information about options evaluated for the client 200, provided to the client 200, and about actions the client 200 has taken. This information may include the client's credit score results and recommendations, the client's decisions as to which recommendations to implement, the outcome of any actions implemented on behalf of the client 200, and whether the client 200 failed to complete any part of the process. The information may be any information obtained through the operation of the credit score system 230. In addition, such information may be used to further generate a pattern of behavior or desires of the client 200, and be an indicator of potential future desired actions by the client 200.

The embodiment shown in FIG. 2 is one exemplary embodiment of the present invention. Other embodiments may be used without departing from the scope of the present invention. One or more of the components shown in FIG. 2 could comprise sub-components of a larger component. For example, the client data collection component 206 and the scenario generator component 208 could be sub-components of the data warehouse 202. Similarly, the components shown in FIG. 1 could comprise multiple sub-components. Thus, the scenario generator component 208 may comprise a sub-component for communicating with the data warehouse component 202 and another component to communicate with the credit score algorithm components 204$a$ and 204$b$. Any arrangement of components is possible without departing from the scope of the present invention as long as the theme and objective of the present invention is met.

FIG. 2 shows a logical arrangement of components according to the present invention. Any physical arrangement of the components may be used without departing from the scope of the present invention. Generally, the components may be arranged in any fashion depending on the needs of the entity using the present invention. For example, all of the components in system 230 may be located on a single server. Alternatively, the data warehouse component 202, the scenario generator component 208, and the client data collection component 206 may be located on one server. The results evaluator component 212 may be located on another server and the action evaluator component 214 on a third server. The components would communicate with each other through a network. In another arrangement, the components are replicated across multiple servers in a network to reduce the load on the individual servers. Other configurations are also possible and within the scope of the present invention.

Figure 3:
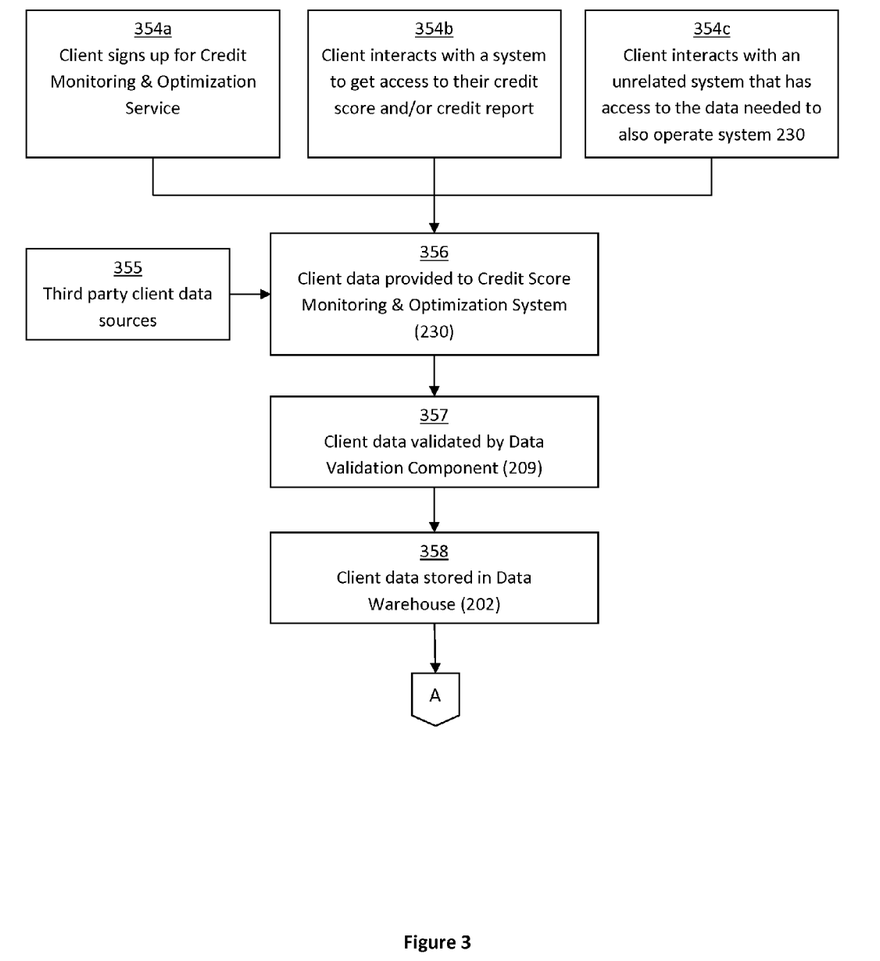
FIG. 3 shows a method of operating various exemplary embodiments of the present invention.
Figure 4:
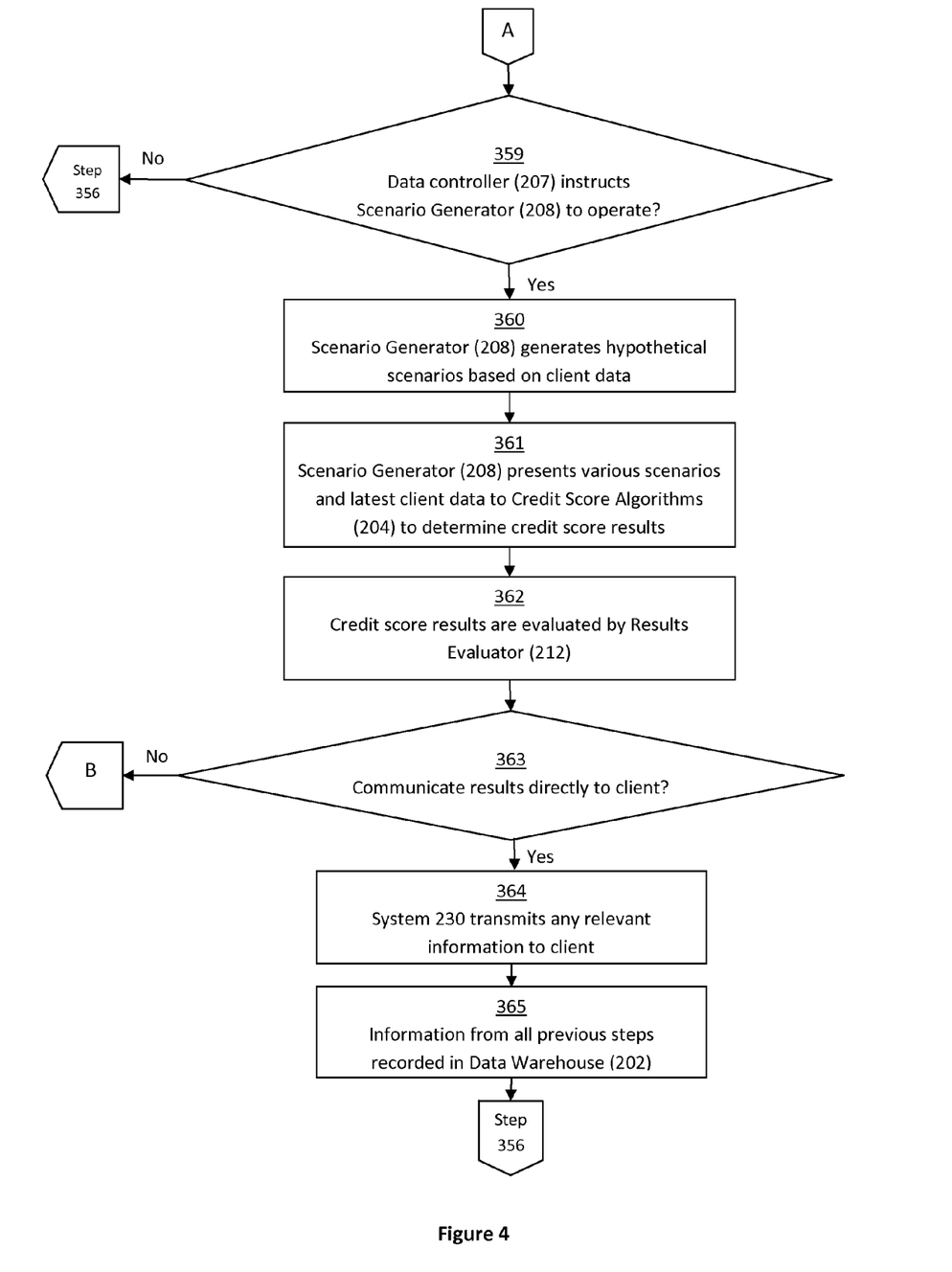
FIG. 4 is a continuation of the method shown in FIG. 3.
Figure 5:
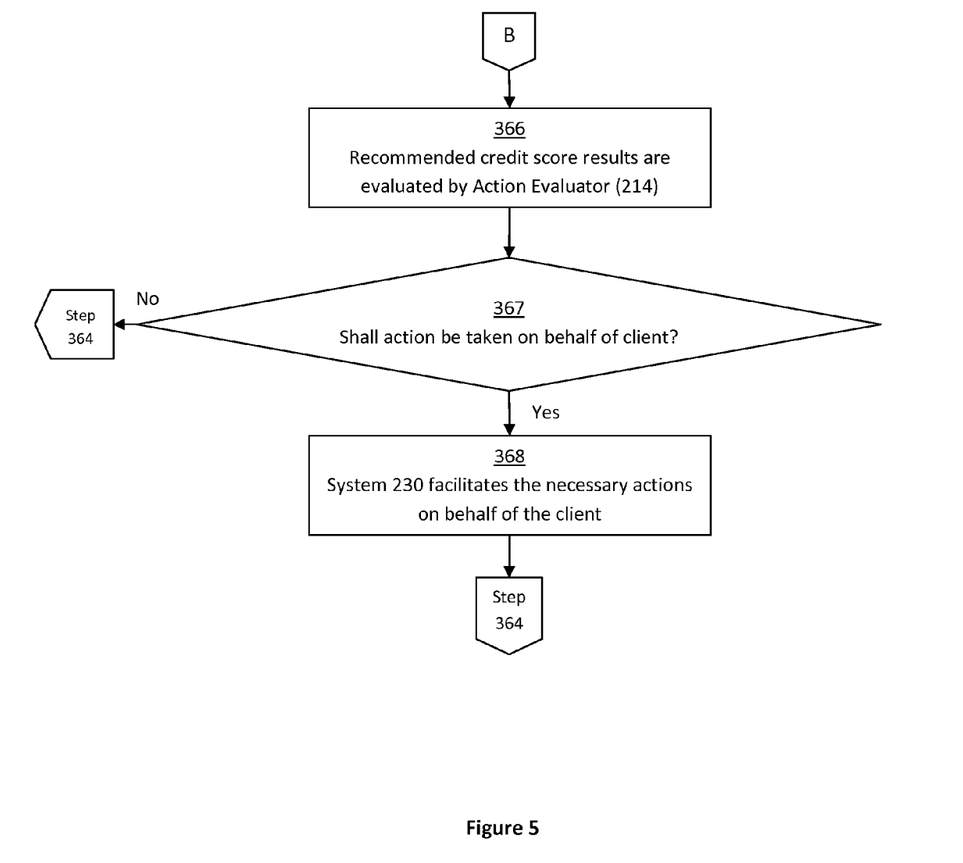
FIG. 5 is a continuation of the method shown in FIG. 3 and FIG. 4.

FIGS. 3, 4, and 5 show an exemplary method of performing the present invention. The method may begin in any number of ways. FIG. 3 shows several possible starting points. In option 354$a$, the client 200 signs up for the Credit Monitoring & Optimization Service. The client could sign up directly through a website or mobile application, or in a number of other ways. For example, the present invention could be offered by a financial advisor as a way to further help her customers. The client could sign up for the service, or the financial advisor could sign up the client for the service with the client's permission. The service could also be offered by a third party. The client learns about the service and visits the third party's web site or mobile application and signs up via the web site. In option 354$b$, the client interacts with a generic credit report system in order to get access to his credit score and/or credit report and while that is occurring, embodiments of the present invention operate in the background as an added benefit to the clients. This generic credit report system can be a completely separate system that is operated by the same company which operates systems and/or methods according to the present invention or it can be a separate generic credit report system operated by a third party company (e.g., Experian, Equifax, TransUnion) or it can even be within a larger generic credit report system that includes the present credit score system 230 within it. Stated differently, the client can be using a generic credit report system that has nothing to do with the function of the present invention, but which generic credit report system somehow is connected to the present invention. In option 354$c$, the client can be interacting with a generic system that is unrelated to the present invention but for whatever reason has access to the data that the credit score system 230 requires to operate and therefore, the operator of that unrelated system would like to offer the present invention as an added benefit to its clients. For example, the client could be logged-in to his credit card company's website and the credit card company, using the credit score system 230, determines that the client could increase his credit score by opening an additional credit card. At that point, the credit card company communicates to the client the recommendation to open an additional credit card in order to improve his credit score. In this scenario, the present invention 230 serves as a back office recommendation provider to the user, without the user having to sign-up to use the credit score system 230. In another example, the client is logged-in to a website that is assisting the client with his budget. Assuming that this website has access to the data that is needed by the credit score system 230, the budget-assistance website, by utilizing the credit score system 230, determines that the client could increase his credit score by using $2,000 from his savings account to pay down one of his credit cards. At that point the budget website presents this recommendation to the client.

One or more steps of the method shown in FIGS. 3, 4, and 5 may be performed in real time. For example, the client may be interacting with another system or service (unrelated to the present credit monitoring and optimizing system), as shown in step 354c. While the client is interacting with the unrelated system, the other method steps are performed and the client is presented with results right away.

Alternatively, one or more steps of the method may be performed separately in time from one another. For example, the client may have signed-up for the unrelated system or service shown in step 354c several months prior to interacting with the credit score system 230. Similarly, several of the method steps may be repeated over the course of time, as shown by the fact that the system in FIGS. 3, 4, and 5 is a closed loop system that runs on a continuous basis.

The system then collects client information in step 356. The system can collect client information/data using multiple techniques, such as collecting information from the client directly, collecting information from third party data sources 355, or having a third party input client information on behalf of the client. The client information is validated in step 357 to make sure that the client has entered all the necessary information correctly. Once validated, the client information is stored in a data warehouse (step 358).

The exemplary method continues in FIG. 4 with step 359, in which the data controller 207 determines whether to instruct the scenario generator component 208 to operate. The method ensures that the data controller 207 continuously evaluates whether there have been any changes to the client data that will warrant the scenario generator 208 to operate, or whether the scenario generator 208 should operate based on the client's preferences, or whether the client has submitted any custom scenarios that require evaluation. If not, it repeats steps 356-359. Repeating steps 356-359 also ensures that the client data stored in the data warehouse is continually kept up to date. The client data can be updated in a number of ways. The client could log in to the system and provide updated information. The system could pull updated information from a client's account with a financial institution or from the client's credit report. The system could update the information received from a third party. If the system obtains a credit report, this would show up in the credit report as a "monitoring or soft inquiry". In this fashion the client's credit is not damaged through repeated "credit inquiries". If the data controller instructs the scenario generator to operate, the method proceeds to step 360; otherwise, the method proceeds to step 356.

In step 360, the scenario generator component 208 evaluates all the data stored in the data warehouse in order to generate hypothetical scenarios that are relevant to both the client's financial situation and needs. The scenario generator will use a number of criteria in generating these hypothetical scenarios including the client's behavior, feasible options based on the client's financial situation and needs and all the different permutations of these options, a standard set of rules/options based on the client's preferences and all the different permutations of these options, and other mathematical models or decision trees. The scenario generator component can use any of these criteria as well as other criteria for generating hypothetical scenarios.

Once the scenario generator component has completed generating all the hypothetical scenarios, then the hypothetical scenarios, together with the client's custom scenarios and the client's latest data, are all transmitted in step 361 to the credit score algorithm components. During step 361, the credit score algorithm components also determine the credit score results for each of the scenarios that they received. The credit score algorithm components will then transmit the credit score results in step 362 to the results evaluator component 212 where the results will be evaluated and the next steps will be determined.

In step 362, the results evaluator component 212 evaluates the various credit score results based on a number of criteria, such as the client's needs, the simplicity of actions associated with each particular scenario, the number of actions required to implement each particular scenario, the credit score impact in terms of number of points, the client's likelihood of acting on the recommended scenario, and the expected savings that the client will realize by acting on the scenario. The results evaluator component 212 can use any of these criteria, as well as other criteria, for evaluating credit score results and determining what to recommend to the client. The results evaluator 212 may not evaluate the client's custom scenarios since the client might have requested to be notified of the results regardless of what the results evaluator 212 might recommend.

After evaluating the credit score results and identifying which credit score results to recommend, the results evaluator component 212, in step 363, decides, based on the client's preferences, which credit score results (if any) should be communicated directly to the client and which credit score results (if any) should be communicated to the action evaluator component 214. The client can specify if the client wants the system to implement certain recommendations on the client's behalf, subject to a set of constraints, or to never implement anything on the client's behalf. The client can also specify how the system should transmit the information (using phone, e-mail, etc.), when the system should transmit the information (including whether or not the system should transmit the information at all), and whether, based on priority, the system should transmit the information in a different manner (e.g., send mobile phone text message instead of e-mail). If the client has chosen to never allow the system to implement any recommendations on the client's behalf, then the method continues on step 364. Otherwise, the system transmits the information about the recommended credit score results to the action evaluator in step 366, shown in FIG. 5.

In step 364 the system transmits any relevant information to the client based on the client's preferences. For example, it may transmit information about the recommended actions, the credit score results, the hypothetical scenarios evaluated, whether any actions were implemented on behalf of the client or anything else that might require the client's approval or might be of interest to the client.

The method continues with step 365, in which any information from the previous activities is recorded in the data warehouse 202. This information can be any information about the transaction, such as the credit score results presented to the client, any actions or information or custom scenarios presented by the client, which recommendations (if any) the client approved, the outcome of any automated actions, and whether or not the client abandoned the process at any point. If, for example, the client receives a recommendation that will prevent damage to the client's credit score, the recommendation may be recorded in the data warehouse as part of the client's history. The process then proceeds to step 356, where it begins again.

As shown by FIG. 5, in step 366 the recommended credit score results are evaluated for their feasibility as it relates to having the system 230 take an action on behalf of the client. The feasibility is determined based on both the client's preferences and the system's ability to implement the recommended actions (for example, whether the system has the appropriate capabilities and whether the system has or can obtain the appropriate authorization and access). The method continues with decision step 367 where it is determined whether an action on behalf of the client should be taken. The decision is made based on both the feasibility results from step 366 and the client's approval. The client may specify whether the approval in step 367 should be performed manually by the client or by the system based on the client's criteria and appropriate authorizations. Exemplary criteria might be to only automatically approve recommendations which would result in a significant credit score increase (such as 20 points) or significant annual savings (such as $1000). Annual savings may arise from an improved credit score, for example, by enabling the client to refinance existing loans at lower rates. Once a recommended action that is also deemed feasible is approved, whether by the client or by the system, the method continues with step 368, in which the system either assists the client in the implementation or fully implements, on behalf of the client, the recommended action. If the action evaluator determines that no action should be taken on behalf of the client 200 then the method continues to step 364.

The process of implementing the recommended action, as shown by step 368, may occur in a number of ways, depending on the type of action. The system may employ a number of techniques to simplify the process and cut costs. For example, if the desired action is to open a new credit card on behalf of the client, the system might interface directly with a credit card company and submit the client's application. In another example, if the desired action is to make a $2,000 payment to the client's credit card, the system might make the payment on behalf of the client and separately bill the client. Once the necessary actions have been implemented, the method continues to step 364.

As shown by FIGS. 3, 4, and 5, the method never concludes. Instead, it keeps repeating steps 356-368. The repetition could occur based on a predetermined schedule (daily, weekly, monthly), based on client behavior as reflected in client data, based on changes in the credit score algorithms, based on the request of the client, based on changes in the client's financial situation, or based on any combination of these or other factors. Continually querying credit score algorithm components with hypothetical scenarios and up-to-date client information permits the system to provide the client with the best recommendations on how to best optimize his credit score, on an on-going basis, without the need for client command, prompt or interaction. For example, a client in September might have 23 months of credit history and just opened a couple of credit cards. Opening an additional credit card at that point in time will hurt his credit score as determined by the credit score algorithms. Two months later, in November, the client's credit history is 25 months old and at that point in time the credit score algorithms determine that an additional credit card will have a positive impact on the client's credit score instead of a negative one. Through repeated querying, the system will pick up on these hypothetical scenarios and will warn the client in September not to open a new credit card. It will also recommend to the client in November to open a new credit card. In this fashion the client is assured of having the most optimized credit score at all points in time. This evaluation is merely exemplary; the system can evaluate and create multiple scenarios using multiple factors in addition to the clients need's, including the feasibility of different options, the simplicity of the recommended options, the client's financial situation, and others. The factors taken into account may vary depending on the client's unique data and needs.

In the method previously described, steps 356-368 are repeated, as shown by FIGS. 3, 4, and 5. However, any of the steps may be repeated in order to provide the client 200 with the best available credit score results. Continually updating client information and scoring and evaluating different hypothetical scenarios permits the system to offer the client a dynamic picture of how to best optimize his credit score. The client no longer needs to worry that one of his actions might have unintended consequences on his credit score or that he might be unaware of simple steps that would improve his credit score and, in turn, save him money by qualifying for lower interest rates and lower insurance premiums. The present invention ensures that the client will always be on top of an optimized credit score in a hassle free way.

The present invention also relates to an apparatus for performing the operations herein. This apparatus is specially constructed for the required purposes, or it comprises a general-purpose computer selectively activated or reconfigured by a computer program stored in the computer. Such a computer program is stored in a tangible and non-transitory computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A system for automatically monitoring and on a recurring basis optimizing consumer credit scores, the system comprising:
a server; and
a memory in communication the server, the memory storing a logic that is executed by the server to perform operations including:
detecting, in real time, a change in an information about a client, the information including the client's personal information and financial product information about the client, the financial product information including account information and credit information, the information being stored in a data warehouse and being updated from a client interface for receiving client-input information and from a plurality of sources including financial institutions, credit bureaus, public records, and third party sources;
creating one or more hypothetical scenarios based on a pattern of behavior observed in the financial product information, wherein the one or more hypothetical scenarios include potential future actions that have not yet been performed by the client;
generating a potential credit score for each hypothetical scenario;
evaluating and comparing a plurality of the potential credit scores to determine an optimal credit score; and
generating an alert to be transmitted to the client, the alert identifying a recommended action to be performed by the client to achieve or maintain the optimal credit score.

2. The system of claim 1, wherein the server further performs operations including validating the information.

3. The system of claim 1, wherein the server further performs operations including performing the recommended action on behalf of the client.

4. The system of claim 3, wherein the recommended action is performed based on the client's preferences.

5. The system of claim 4, wherein the server performs the recommended action by interacting with financial institutions and/or credit card companies.

6. The system of claim 1, wherein the third party sources include credit bureaus, terms on financial products and public records.

7. The system of claim 1, wherein the information includes one or more of the client's existing financial products, personal information, needs and/or goals, system preferences, credit reports and public records, assets and liabilities, and custom scenarios.

8. The system of claim 1, wherein the information is collected through one or more of the following: directly from the client; directly from financial institutions, credit bureaus, public records, and other third parties; and by logging-in to a client's existing account with a financial institution or other organization and downloading client information.

9. The system of claim 1, wherein the one or more hypothetical scenarios are generated through one or more of the following: a standard set of rules/options, or feasible options based on the client's financial situation.

10. The system of claim 1, wherein the optimal credit score is determined based on one or more of the following criteria and techniques: the client's needs; complex mathematical models and/or decision trees; the simplicity of both the type of actions and the number of actions required to implement each recommendation; the credit score impact in terms of number of points; and the client's likelihood of acting on the recommended action and expected savings.

11. A system for automatically monitoring and on a recurring basis optimizing consumer credit scores, the system comprising:
a processor; and
a memory in communication with the processor, the memory storing logic that is executed by the processor to perform operations including:
receiving a permission from a client to implement a recommended action on behalf of the client;
continuously collecting and updating information about the client from a plurality of sources in real time and on a recurring basis independently from client interaction, wherein the information includes the client's personal information and financial product information about the client, the financial product information including account information and credit information, wherein the plurality of sources includes financial institutions, credit bureaus, public records, and third party sources, and wherein the information is stored in a data warehouse component;
creating a plurality of hypothetical scenarios based on a pattern of behavior observed in the financial product information, wherein the creating occurs automatically upon detecting a change in the financial product information, and wherein each of the plurality of hypothetical scenarios includes a potential future action that has not yet been performed by the client;
generating a most recent potential credit score for each hypothetical scenario;
evaluating and comparing a plurality of the most recent potential credit scores and transmitting a subset of the plurality of the most recent potential credit scores to the client along with a recommended action to be performed; and
evaluating whether a recommended action on behalf of the client should be taken based on the client's preferences, the permissions received from the client, and an ability to implement the recommended action.

12. The system of claim 11, wherein the processor further performs operations including implementing the recommended action on behalf of the client based on the client's preferences and by interacting with financial institutions or credit card companies.

13. The system of claim 11, wherein the information further includes one or more custom scenarios provided by the client, each custom scenario comprising a client-created set of variables which is used to determine the potential credit score.

14. The system of claim 11, wherein the plurality of hypothetical scenarios are generated through one or more of the following: a standard set of rules/options; feasible options based on the client's financial situation; and client behavior pattern observation.

15. The system of claim 11, wherein the most recent potential credit scores are evaluated and compared based on one or more of the following criteria and techniques: the client's needs; complex mathematical models and/or decision trees; the simplicity of both the type of actions and the number of actions required to implement each recommendation; the credit score impact in terms of number of points; and the client's likelihood of acting on the recommended scenario and the expected savings.

16. A non-transitory computer readable medium storing logical instructions for automatically monitoring and optimizing consumer credit scores for a client, the logical instructions being executed by a computer to perform operations comprising:

continuously collecting and updating client information in real time and on a recurring basis, the client information including the client's personal information and financial product information about the client, the financial product information including account information and credit information;

detecting a pattern of behavior in the financial product information;

automatically creating hypothetical scenarios based on the pattern of behavior, wherein the hypothetical scenarios include potential future actions that have not yet been performed by the client;

generating a potential credit score for each hypothetical scenario;

comparing a plurality of the most recent potential credit scores received for each hypothetical scenario and filtering a subset of the plurality of the most recent potential credit scores; and generating and transmitting to the client a set of recommendations for the client based on the comparison and filtering of the most recent potential credit scores.

17. The method of claim 16, further comprising: implementing the most optimal of the recommendations automatically and without client intervention.

18. The method of claim 17, further comprising evaluating whether an action on behalf of the client should be taken based on the client's preferences and permissions and an ability to implement the recommended action.

19. The method of claim 17, wherein the implementing step occurs by interacting with financial institutions and/or credit card companies.

20. The method of claim 16, wherein the collecting and updating step includes collecting client information relating to one or more of the client's existing financial products, personal information, needs and/or goals, system preferences, credit reports and public records, assets and liabilities, and custom scenarios.

21. The method of claim 16, wherein the collecting and updating step includes collecting client information through one or more of the following: directly from the client; directly from financial institutions, credit bureaus, public records, and other third parties; and by logging-in to a client's existing account with a financial institution or other organization and downloading client information.

22. The method of claim 16, wherein the creating hypothetical scenarios step is further capable of generating hypothetical scenarios through one or more of the following: a standard set of rules/options, or feasible options based on the client's financial situation.

* * * * *